US012259480B2

(12) United States Patent
Lyusin et al.

(10) Patent No.: US 12,259,480 B2
(45) Date of Patent: Mar. 25, 2025

(54) METHOD AND SYSTEM FOR PROVIDING AUTHENTICATION TO GNSS OPEN SERVICE SIGNALS AND INTEROPERABLE SECURE POSITIONING

(71) Applicant: Magellan Systems Japan, Inc., Hyogo (JP)

(72) Inventors: Sergey Lyusin, Moscow (RU); Nobuhiro Kishimoto, Hyogo (JP)

(73) Assignee: Magellan Systems Japan, Inc., Amagasaki (JP)

( * ) Notice: Subject to any disclaimer, the term of this patent is extended or adjusted under 35 U.S.C. 154(b) by 47 days.

(21) Appl. No.: 17/961,154

(22) Filed: Oct. 6, 2022

(65) Prior Publication Data

US 2023/0028995 A1 Jan. 26, 2023

Related U.S. Application Data

(63) Continuation of application No. PCT/IB2021/052499, filed on Mar. 25, 2021.

(60) Provisional application No. 63/007,788, filed on Apr. 9, 2020.

(51) Int. Cl.
*G01S 19/24* (2010.01)
*G01S 19/31* (2010.01)

(52) U.S. Cl.
CPC ............ *G01S 19/243* (2013.01); *G01S 19/31* (2013.01)

(58) Field of Classification Search
CPC ...... G01S 19/243; G01S 19/31; G01S 19/215; G01S 19/02
See application file for complete search history.

(56) References Cited

U.S. PATENT DOCUMENTS

| 8,391,490 | B2 | 3/2013 | Damidaux |
| 2015/0171917 | A1* | 6/2015 | Turner .................. H04B 1/707 375/147 |
| 2015/0365824 | A1* | 12/2015 | Gustafson ............ H04L 9/0844 380/263 |
| 2019/0097676 | A1 | 3/2019 | Martin et al. |

(Continued)

OTHER PUBLICATIONS

International Search Report No. PCT/IB2021/052499, Dated Aug. 23, 2021.

(Continued)

*Primary Examiner* — David S Huang
(74) *Attorney, Agent, or Firm* — Beyer Law Group LLP

(57) ABSTRACT

Authentication mechanism is provided to open service signals in Global Navigation Satellite Systems (GNSS), by inverting a plurality of bits in a pseudorandom noise code in a GNSS signal having a predetermined period of a binary bit sequence of N bits. A position of each inverted bit in the binary bit sequence is specified by a serial number generated for each period using a cryptographic pseudorandom number generator, where at least one of the position of the inverted bit and a number of the inverted bits in the period varies period by period. A decryption key is provided to a GNSS receiver, which correlates, using a corresponding cryptographic pseudorandom number generator, the received GNSS signal, and accumulates an amplitude thereof at the inverted bit, thereby determining if the received signal is counterfeit based on the ratio of the inverted bit amplitude with respect to the signal amplitude.

11 Claims, 3 Drawing Sheets

(56) References Cited

U.S. PATENT DOCUMENTS

2023/0305167 A1* 9/2023 Gomez Casco ...... G01S 19/243

OTHER PUBLICATIONS

Authentication Concepts for Satellite-Based Augmentation Systems, Andrea Dalla Chiara, September, Dec. 16, 2016.
Authenticating GNSS Proofs against Spoofs, Guenter W. Hein, Sep./Oct. 2007.
Chips-Message Robust Authentication (Chimera) for GPS Civilian Signals, Jon M. Anderson, Sep. 25-29, 2017.

* cited by examiner

Ranging Signals of QZSS

| Signal | Frequency MHz | Service | Compatibility | QZS-1 IGSO | QZS-2/4 IGSO | QZS-3 GEO |
|---|---|---|---|---|---|---|
| L1C/A | 1575.42 | Positioning | Complement GPS | ✓ | ✓ | ✓ |
| L1C | 1575.42 | Positioning | Complement GPS | ✓ | ✓ | ✓ |
| L1S | 1575.42 | Augmentation(SLAS) | DGPS (Code Phase Positioning) | ✓ | ✓ | ✓ |
| L1Sb | 1575.42 | Messaging | Short Messaging | ✓ | ✓ | ✓ |
| L2C | 1227.60 | Augmentation(SBAS) | SBAS (L1) Service | - | - | ✓ |
| L5 I/Q | 1176.45 | Positioning | Complement GPS | ✓ | ✓ | ✓ |
| L5S | 1176.45 | Positioning | Complement GPS | ✓ | ✓ | ✓ |
| L6D | 1278.75 | Experimental(L5 SBAS) | L5 SBAS (DFMC) | - | - | ✓ |
| L6D | 1278.75 | Augmentation(CLAS) | PPP-RTK (Carrier Phase Positioning) | ✓ | ✓ | ✓ |
| L6E | 1278.75 | Experimental(MADOCA) | PPP, PPP-AR (Carrier Phase Positioning) | - | ✓ | ✓ |

FIG. 1

METHOD AND SYSTEM FOR PROVIDING AUTHENTICATION TO GNSS OPEN SERVICE SIGNALS AND INTEROPERABLE SECURE POSITIONING

CLAIM OF PRIORITY

This application is a Continuation of International Patent Application No. PCT/IB2021/052499 filed on Mar. 25, 2021, which claims priority to U.S. Provisional Patent Application No. 63/007,788, filed on Apr. 9, 2020. The entire contents of each application noted above are hereby incorporated by reference.

BACKGROUND OF THE INVENTION

1. Field of the Invention

The present invention relates to authentication of GNSS signals. More specifically, the present invention relates to a method and system for providing GNSS open service signals with an authentication mechanism and protection against spoofing, without compromising the operation of the open signals.

2. Description of the Related Art

Global Navigation Satellite Systems (GNSS) available today include United States Global Positioning System (GPS), Russian Global Orbiting Navigation Satellite System (GLONASS), European Union's Galileo, China's BeiDou Satellite Navigation System (BDS, formerly known as Compass), and Japanese Quasi-Zenith Satellite System (QZSS).

GNSS provides open service signals for civilian users, as well as encrypted service signals for governmental, regulated, and/or military users. For example, encrypted GPS signals (Y code signals) are only received and utilized by military receivers with the encryption key, while open service signals (such as C/A, L1C, L2C, L5 code signals) are available to general commercial/civil receivers without encryption keys. Similarly, Galileo provides Open and Commercial GNSS services, and Public Regulated Service (PRS) which is an encrypted navigation service for governmental authorized users and sensitive applications such as public safety and emergency services, such as firefighters, police, border control and infrastructure.

Although their implementation may be more costly and complicated, such encrypted GNSS signals are more resistant to attacks such as spoofing which transmits counterfeit GNSS signals that may force a receiver to compute an erroneous position and lead the user to believe they are in a different location from where they actually are. However, civil GNSS signals or GNSS open service signals are vulnerable to such spoofing attacks. As economic and practical dependences on civil GNSS signals for transportation, location services, communication, finance, power distribution, and other applications increase, protecting GNSS open service signals against spoofing becomes one of the serious and urgent issues.

BRIEF DESCRIPTION OF THE INVENTION

The embodiments of the present invention provide authentication mechanism to open service signals in Global Navigation Satellite Systems (GNSS). A method in accordance with one embodiment of the present invention includes inverting a plurality of bits in a pseudorandom noise code in a GNSS signal having a predetermined period of a binary bit sequence of N bits (N: a natural number), where a position of each inverted bit in the binary bit sequence is specified by a serial number generated for each period using a cryptographic pseudorandom number generator, such that at least one of the position of the inverted bit and a number of the inverted bits in the period varies period by period. A decryption key is provided to a GNSS receiver having a corresponding cryptographic pseudorandom number generator.

In accordance with one embodiment of the present invention, the pseudorandom noise code may be a coarse acquisition (C/A) code having 1023 chips per period corresponding to the N bits.

In accordance with one embodiment of the present invention, the serial number ranges from 1 to N such that each period includes an inverted bit at the position corresponding to the serial number. Alternatively, a plurality M (M: a natural number greater than 1) of serial numbers may be generated for each period, where each serial number ranges from 1 to N, such that each period includes M inverted bits at respective positions corresponding to the M serial numbers.

More generally, a plurality M (M: a natural number greater than 1) of serial numbers may be generated per period, where each serial number ranges from 1 to kN (k: a number greater than 1), such that each period includes 0 to M inverted bits at respective positions corresponding to the serial numbers which have a value between 1 to N, inclusive, among the M serial numbers, whereby providing M/k inverted bits per period on average.

An embodiment of the present invention provides a method for authenticating open service signals in Global Navigation Satellite Systems (GNSS). The method includes (a) receiving at a GNSS receiver, a plurality of GNSS signals each including a pseudorandom noise code having a predetermined period of a binary bit sequence of N bits (N: a natural number), the received pseudorandom nose code being supposed to be a modified pseudorandom noise code including a plurality of inverted bits at positions each specified by a serial number, the serial number being generated for each period using a cryptographic pseudorandom number generator such that at least one of the position of the inverted bit and a number of the inverted bits in the period varies period by period, (b) amplifying, frequency converting, and performing analog-to-digital signal conversion of the received GNSS signal at the GNSS receiver, (c) correlating a local pseudorandom noise code signal generated in the GNSS receiver with a received pseudorandom noise code signal, thereby generating a correlated signal, (d) accumulating an amplitude of the correlated signal for a predetermined time interval, thereby obtaining an accumulated signal amplitude for the received pseudorandom noise code signal, (e) generating pseudorandom serial numbers by a pseudorandom number generator in the GNSS receiver using a decryption key associated with the cryptographic pseudorandom number generator, (f) selecting an inverted bit amplitude which is an amplitude of the correlated signal at the inverted bit, based on the pseudorandom serial numbers and the local pseudorandom noise code, (g) accumulating the inverted bit amplitude for the predetermined time interval, thereby obtaining an accumulated inverted bit amplitude for the received pseudorandom noise code signal, (h) calculating a ratio of the accumulated inverted bit amplitude to the accumulated signal amplitude, (i) comparing the ratio with a first threshold value and a second threshold value, and (j) determining that the received GNSS signal is counterfeit if the ratio is smaller than the first threshold value, that the received GNSS signal is authentic if the ratio is greater than the second threshold value, and that the received GNSS signal is unauthenticated if the ratio is between the first threshold value and the second threshold value.

If the ratio is between the first threshold and the second threshold, the process steps of accumulating the amplitude, the calculating the ratio may be continued for an extended time interval so as to accumulate the calculated ratios for the extend time interval to produce an accumulated ratio, and the accumulated ratio may be compared with the first and second threshold to perform the determination.

The selecting the inverted bit amplitude may outputting an amplitude of the correlated signal, if a current bit serial number of the local pseudorandom noise code for the correlated signal matches the pseudorandom serial number indicating the inverted bit position in the corresponding period.

In accordance with one embodiment of the present invention, a Global Navigation Satellite Systems (GNSS) receiver is capable of authenticating GNSS open service signals. The GNSS receiver includes a GNSS antenna configured to receive a plurality of GNSS signals, a frontend section, a digital processing section, and an open signal authentication apparatus. Each of the GNSS signals includes a modified pseudorandom noise code having a predetermined period of a binary bit sequence of N bits (N: a natural number). The modified pseudorandom noise code includes a plurality of inverted bits at positions each specified by a serial number, where the serial number is generated for each period using a cryptographic pseudorandom number generator such that at least one of the position of the inverted bit and a number of the inverted bits in the period varies period by period. The frontend section performs amplification, frequency conversion, and analog-to-digital signal conversion of the received GNSS signals.

The digital processing section includes a correlator configured to correlate a locally-generated pseudorandom noise code signal with a received pseudorandom noise code signal, thereby generating a correlated signal, and a first accumulator configured to accumulate an amplitude of the correlated signal for a predetermined time interval, thereby producing an accumulated signal amplitude for the received pseudorandom noise code signal.

The open signal authentication apparatus includes a memory storing a decryption key associated with the cryptographic pseudorandom number generator, a pseudorandom number generator configured to generate pseudorandom serial numbers using the decryption key, an inverted bit selector configured to select an inverted bit amplitude which is an amplitude of the correlated signal at the inverted bit, based on the pseudorandom serial numbers and the locally-generated pseudorandom noise code, a second accumulator configured to accumulate the inverted bit amplitude for the predetermined time interval, thereby generating an accumulated inverted bit amplitude for the received pseudorandom noise code signal, a calculating section configured to calculate a ratio of the accumulated inverted bit amplitude to the accumulated signal amplitude, and a determining section configured to compare the ratio with a first threshold value and a second threshold value, thereby outputting a determination signal indicating that the received GNSS signal is counterfeit if the ratio is smaller than the first threshold value, that the received GNSS signal is authentic if the ratio is greater than the second threshold value, and that the received GNSS signal is unauthenticated if the ratio is between the first threshold value and the second threshold value.

In accordance with one embodiment of the present invention, the inverted bit selector may output an amplitude of the correlated signal, if a current bit serial number of the local pseudorandom noise code for the correlated signal matches the pseudorandom serial number indicating the inverted bit position in the corresponding period.

In accordance with one embodiment of the present invention, an apparatus authenticates open service signals in Global Navigation Satellite Systems (GNSS) signals received at a GNSS receiver. Each of the GNSS open service signals includes a modified pseudorandom noise code having a predetermined period of a binary bit sequence of N bits (N: a natural number). The modified pseudorandom noise code includes a plurality of inverted bits at positions each specified by a serial number, where the serial number is generated for each period using a cryptographic pseudorandom number generator such that at least one of the position of the inverted bit and a number of the inverted bits in the period varies period by period. The apparatus is in communication with a digital signal processor of the GNSS receiver, and the apparatus includes a memory that stores a decryption key associated with the cryptographic pseudorandom number generator used for generating the modified pseudorandom noise code, a pseudorandom number generator configured to generate pseudorandom serial numbers using the decryption key, and an inverted bit selector.

The inverted bit selector selects an inverted bit amplitude which is an amplitude of the correlated signal at the inverted bit, based on the pseudorandom serial numbers and the locally-generated pseudorandom noise code. For example, the inverted bit selector outputs an amplitude of the correlated signal, if a current bit serial number of the local pseudorandom noise code for the correlated signal matches the pseudorandom serial number indicating the inverted bit position in the corresponding period.

The apparatus further includes an accumulator configured to accumulate the inverted bit amplitude for a predetermined time interval, thereby generating an accumulated inverted bit amplitude for the received pseudorandom noise code signal, a calculating section configured to receive, from the digital signal processing section, an accumulated signal amplitude of the received pseudorandom noise code signal, the accumulated signal amplitude being an accumulation of an amplitude of the correlated signal for the predetermined time interval, and to calculate a ratio of the accumulated inverted bit amplitude to the accumulated signal amplitude, and a determining section configured to compare the ratio with a first threshold value and a second threshold value, thereby outputting a determination signal indicating that the received GNSS signal is counterfeit if the ratio is smaller than the first threshold value, that the received GNSS signal is authentic if the ratio is greater than the second threshold value, and that the received GNSS signal is unauthenticated if the ratio is between the first threshold value and the second threshold value.

In accordance with one embodiment of the present invention, a method provides a region-dependent access to encrypted service signals in Global Navigation Satellite Systems (GNSS). The method includes (a) providing a plurality of different encryption keys and/or encryption methods to a GNSS satellite, (b) transmitting GNSS signals from the GNSS satellite using a first encryption key and/or encryption method if coordinates of the GNSS satellite in the Earth-Centered, Earth-Fixed (ECEF) coordinate system is in a first range, and (c) transmitting GNSS signals from the GNSS satellite using a second encryption key and/or encryption method if the coordinates of the GNSS satellite in the ECEF coordinate system is in a second range different from the first range.

The method may further includes (d) providing a first decryption key corresponding to the first encryption key and/or encryption method to a GNSS receiver in a first region from which the GNSS satellites having the coordinates in the first range of the ECEF coordinate system are visible, and (e) providing a second decryption key corresponding to the second encryption key and/or encryption method to a GNSS receiver in a second region from which the GNSS satellites having the coordinates in the second range of the ECEF coordinate system is visible. The encrypted service signals may be Public Regulated Service (PRS) signals.

In accordance with one embodiment of the present invention, the method and apparatus for providing authentication to GNSS open service signals discussed above further implement the method for providing a region-dependent access to encrypted service signals in GNSS, such that a sufficient number of secure (i.e., authenticatable) GNSS satellite signals are utilized in a certain region so as to provide secure and spoof resistant navigation services.

BRIEF DESCRIPTION OF THE DRAWINGS

The present invention is illustrated by way of example, and not by way of limitation, in the FIGS. of the accompanying drawings and in which like reference numerals refer to similar elements and in which:

FIG. 1 is a table showing currently available QZSS signals.

DETAILED DESCRIPTION OF EMBODIMENTS OF THE INVENTION

Figure 2:
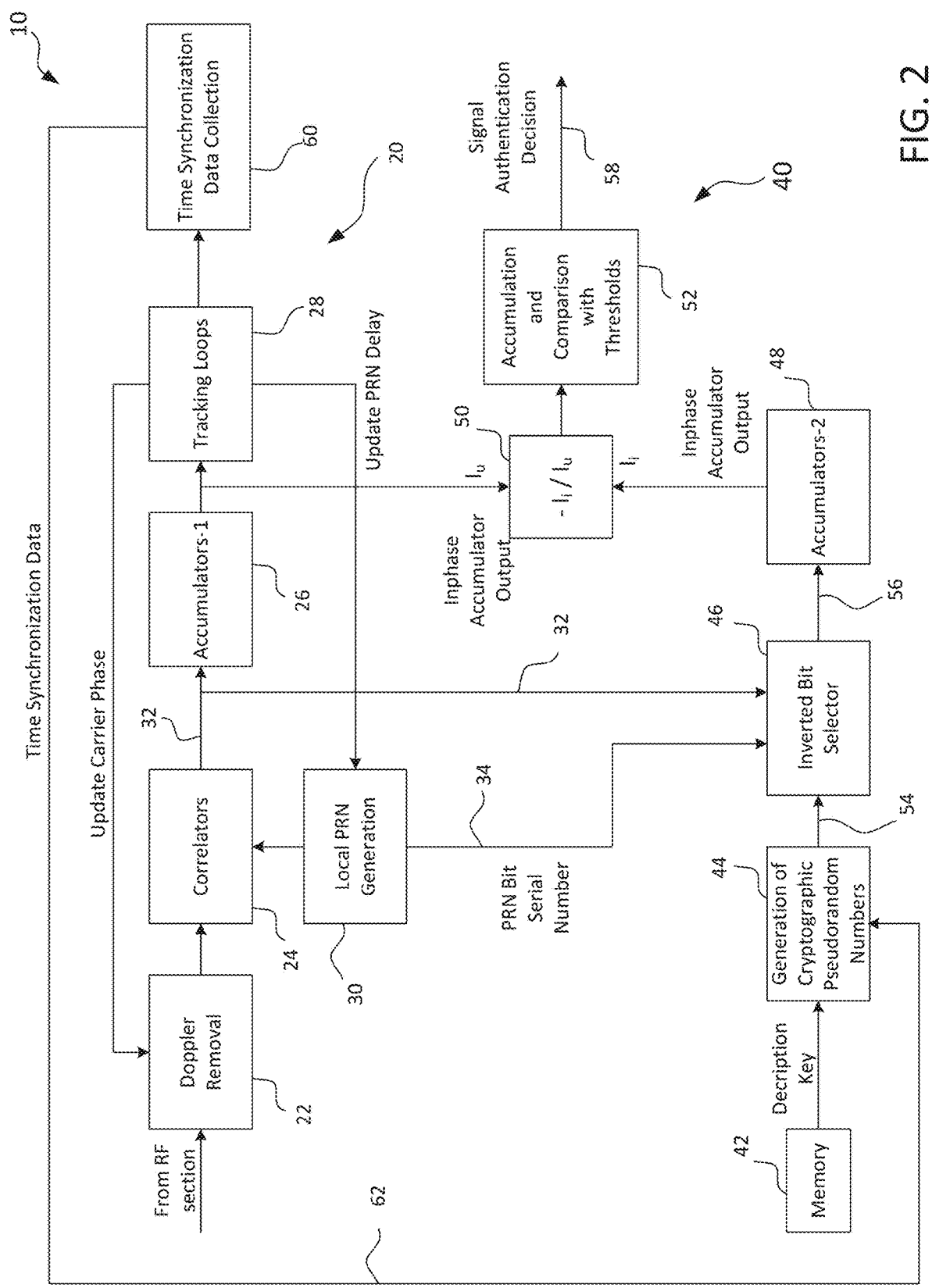
FIG. 2 is a block diagram schematically illustrating an authentication apparatus in accordance with one embodiment of the present invention.

The present invention provides authentication capability to GNSS open service signals and protects such GNSS signals against spoofing attacks.

The present invention relates to a method for using GNSS to provide secure GNSS signals which can be used for important and sensitive applications such as Public Regulated Service (PRS), for example, police, firefighters, health services (ambulance), infrastructure, humanitarian aid, search and rescue, coastguard, border control, customs, and the like. PRS is based on the use of specific (encrypted) GNSS signals having the ability to verify their authenticity, that is, the GNSS signals with security and robustness against malicious interferences such as spoofing attacks. Such GNSS signals may be referred to as secure GNSS signals, encrypted GNSS signals, GNSS PRS signals, or PRS signals.

As mentioned above, Galileo and GPS have such encrypted GNSS signal services for the limited and authorized (governmental or military) users. However, other GNSS may not have such secure and robust GNSS signals for such important and/or sensitive applications. For example, all GNSS signals transmitted from Japanese Quasi-Zenith Satellite System (QZSS) satellites are open and fully known signals for providing the operation of Open Service (OS), as shown in FIG. 1. Accordingly, the present invention provides a method and system for modifying these open service signals in such a way in which the ability of verifying their authenticity is provided without compromising the operation of the OS.

An ordinary or civil GNSS signals (also referred to as open navigation signals, unencrypted GNSS signals, GNSS open service signals, or OS signals), for example, L1 band signals include a C/A code signal based on pseudorandom binary bit sequences. The C/A code has the period of 1023 bits and each bit (or a bit location within the period) can be specified by a serial number ranging from 1 to 1023. In accordance with one embodiment of the present invention, some bits of these pseudorandom binary bit sequences are inverted, and these inverted bits are used to verify the authenticity of the received GNSS signals. For example, a single bit in each period (i.e., one bit out of the 1023 bits) may be inverted. In another embodiment, two or more bits may be inverted within a period of C/A code. If the number of such inverted bits is small, then such inversion will not degrade the OS signals. For example, if the average number of the inverted bits is 0.1%, such modification will not practically worsen the operation of the OS signals, since an energy loss will be less than 0.02 dB, while providing the possibility of reliable authentication of the OS signals in 5-10 seconds.

In order to prevent counterfeiting the OS signals, the serial number(s) specifying the inverted bit(s) within the period of the C/A code should vary from one period to another. For example, such serial numbers may be calculated using a cryptographic pseudorandom number generator. Users (i.e., GNSS receivers) who are allowed access to the modified GNSS signals (having the C/A code with the inverted bits) are provided with a corresponding decryption key for the pseudorandom number generator.

In order to authenticate the modified OS signals, the GNSS receiver is provided with additional correlators which only correlate the inverted bits in the pseudorandom binary sequences, compared with an ordinary GNSS receiver receiving unmodified OS signals. The serial numbers of the inverted bits are determined using decryption apparatus based on the received decryption keys.

The GNSS receiver in accordance with one embodiment of the present invention receives the modified pseudorandom noise signals generated by such a method described above. The GNSS receiver processes the received GNSS signals by amplifying, frequency converting, and performing analog-to-digital signal conversion, and then separately correlates the inverted bits and the remaining unchanged part of the modified pseudorandom noise signals using the decryption key received in advance. Alternatively, the correlation may be performed separately for the inverted bits and for the entire pseudorandom bit sequences.

Signal authentication for the received GNSS signal may be based on calculating a ratio of the accumulated amplitude (for example, an output of an in-phase accumulator) of the inverted bits to the total accumulated amplitude (for example, an output of an in-phase accumulator) of the received OS signal for a certain time interval. If this ratio (expressed as a positive value) is determined to be below a certain lower threshold, then the received OS signal will be considered counterfeit or fake. If the ratio is found to be above a certain upper threshold, it will be considered authentic. If the ratio lies between the lower and upper thresholds, further verification (authentication process) may be necessary. For example, further energy accumulation can be performed.

Since a spoofer will not know the inverted bits in the OS signals, though the spoofer may mimic the pseudorandom noise sequence in general, the specific correlation process to correlate only the inverted bits would produce significantly low correlation (i.e., no or little matching of the inverted bits) compared with the remaining part of the pseudorandom noise binary bit sequences. Thus, such modified OS signals, for example, modified QZSS signals, can be used for the purpose of secure/encrypted service such as PRS.

In accordance with one embodiment of the present invention, interoperability of different GNSS satellites is provided. For example, the number of QZSS satellites may not be sufficient to reliably calculate the position of a GNSS receiver. Thus, the secure PRS signals of other GNSS satellites, for example, the Galileo satellites may also be used by providing interoperability with the QZSS satellites.

Specific GNSS may only be used in a specific region or a specific group of nations. For example, Galileo PRS signals are currently only used by EU member states. Thus, the present invention provides certain changes to the encrypted GNSS signals such as Galileo PRS signals to alleviate the limited number of the available GNSS satellites in another region.

If two regions are geographically separated by a large distance, certain GNSS satellites which are visible in a first region may not be visible in a second region at the same time. For example, Europe (using Galileo) and Japan (using QZSS) are separated by about 10,000 km. As a result, many Galileo satellites visible in Japan are not visible and cannot be used in Europe at the same time. Thus, in such GNSS satellites for a first region, the pseudorandom noise codes and/or encryption keys used to protect PRS in the first region may be changed when the GNSS satellites are invisible in the first region and visible in a second region, and the changed codes and encryption keys may be transferred to be available in the second region.

By providing the changed pseudorandom noise codes and/or encryption keys to GNSS receivers in the second region, the GNSS receivers in the second region are able to perform positioning utilizing both of the secure GNSS signals (including the modified C/A code signals as described above) from the GNSS satellites "native" to the second region and the additional encrypted GNSS signals (with the provided decryption keys) from the GNSS satellites originally for the first region. Since the pseudorandom noise codes and encryption keys are different in the first region and the second region, the security in the first region are not compromised by providing the necessary decryption information to the second region.

Thus, one embodiment of the present invention provides regional separation of accessibility to the secure GNSS signals. For example, a GNSS satellite may use different encryption keys and/or encryption methods to generate secure GNSS signals, depending on the coordinates of the GNSS satellite in the Earth-Centered, Earth-Fixed (ECEF) coordinate system. For example, a first range of the coordinates may define a range of the GNSS satellite position visible in the first region, and a second range of the coordinates may define a range of the GNSS satellite position visible in the second region and invisible in the first region.

In accordance with one embodiment of the present invention, a GNSS receiver for the second region may include a GNSS antenna and signal processors capable of processing the two types of secure GNSS signals received from the two different regional GNSS satellite groups, for example, Galileo and QZSS.

The GNSS receiver implementing the present invention may be configured as a computer including a CPU, a memory (RAM, ROM), and the like therein so as to have the necessary functions. These functions may be realized by means of software/computer programs realizing the respective functions, but a part or the whole of them may be realized by hardware.

EXAMPLES

In accordance with embodiments of the present invention, an authentication method/mechanism is provided to GNSS open service signals, by inverting a plurality of bits in a pseudorandom noise code in a GNSS signal having a predetermined period of a binary bit sequence of N bits (N: a natural number). A position of each inverted bit in the binary bit sequence is specified by a serial number generated for each period using a cryptographic pseudorandom number generator, such that the position(s) of the inverted bit(s) in the binary bit sequence (corresponding to one period), or the number of the inverted bit(s) in the binary bit sequence, or both of the position(s) and the number of the inverted bit(s) vary period by period. A decryption key for a corresponding cryptographic pseudorandom number generator in a GNSS receiver is provided to the GNSS receiver in advance. For example, the pseudorandom noise code may be a GPS coarse acquisition (C/A) code having 1023 chips per period, which corresponds to 1023 bits (i.e., N=1023).

In accordance with one embodiment of the present invention, the serial number which is pseudorandomly generated ranges from 1 to N such that each period includes an inverted bit at a position corresponding to the serial number. A "serial" number means that the generated number is one of a series of numbers ranging from, for example, 1 to N, inclusive.

However, more than one serial numbers may be generated for each period. For example, if two pseudorandom serial numbers are generated, each period includes two inverted bits. More generally, a plurality M (M: a natural number greater than 1) of serial numbers may be generated for each period. In this case, each period includes M inverted bits at respective positions corresponding to the M serial numbers.

In addition, the range of the serial numbers is not limited to 1 to N. That is, more generally, a plurality M of serial numbers may be generated per period, and each serial number may range from 1 to kN (k: a number greater than 1). In this case, each period may include 0 to M inverted bits at respective positions corresponding to the serial numbers which have a value between 1 to N, inclusive, among the M serial numbers. If the pseudorandomly generated serial number is greater than N, the serial number is discarded such that there is no corresponding inverted bit in the period. This scheme provides M/k inverted bits per period on average. For example, if two serial numbers ranging from 1 to 2046 are generated for each period, a given period may have any number from 0 to 4 of inverted bits therein, but an average number of inverted bits per period will be 2.

FIG. 2 schematically illustrates part of GNSS receiver 10 capable of authenticating GNSS open service signals in accordance with one embodiment of the present invention. The GNSS receiver 10 includes a GNSS antenna (not shown) configured to receive a plurality of GNSS signals, a frontend section (RF section) (not shown), a digital processing section 20, and an open signal authentication section (apparatus) 40. The GNSS signals include a pseudorandom noise (PRN) code having a predetermined period (code length) of a binary bit sequence of N bits (N: a natural number), where the modified pseudorandom noise code includes a plurality of inverted bits at positions each specified by a pseudorandom serial number such that at least one of the position of the inverted bit and the number of the inverted bit(s) in the period varies period by period. For example, as mentioned above, when one period of the PRN code has N bits, by generating M pseudorandom serial numbers ranging from 1 to kN for each period, each period has 1 to M inverted bits such that the modified PRN code has M/k inverted bits par period on average. As mentioned above, the PRN code may be GPS coarse acquisition (C/A) code having 1023 chips (bits) per period (i.e., N=1023). However, other PRN code having a different period can be used. For example, Galileo E1 B/C signal has a period (code length) of 4092 chips.

The frontend (RF) section of the GNSS receiver 10 performs amplification, frequency conversion, and analog-to-digital signal conversion of the received GNSS signals, as is well understood by those of ordinary skill in the art. As shown in FIG. 2, the digital processing section 20 includes a Doppler removal block (circuit) 22, an in-phase correlator 24, a first in-phase accumulator 26, tracking loops 28, and a local pseudorandom noise (PRN) code generator 30. The tracking loops 28 includes a delay lock loop (DLL) for providing a correction of the current observed delay to the local PRN code generator 30, a phase lock loop (PLL) and frequency lock loop (FLL) for proving a correction of the phase and frequency to the Doppler removal block 22.

The PRN code generator 30 locally generates a replica of the PRN code, and the correlator 24 correlates the locally-generated PRN code with a received PRN code signal output from the Doppler removal circuit 22 so as to generate a correlated signal 32. The correlated signal output from the in-phase correlator 24 will have a certain constant value (without noise), except the inverted bit positions at which the amplitude changes its sign to the opposite sign (a negative value). The accumulator 26 accumulates the amplitude of the correlated signal for a predetermined time interval, so as to produce an accumulated signal amplitude Iu for the received PRN code signal.

As shown in FIG. 2, the open signal authentication section 40 includes a memory 42, a cryptographic pseudorandom number generator 44, an inverted bit selector 46, an in-phase accumulator (second accumulator) 48, a ratio calculator (calculating section) 50, and a determining section 52. The memory 42 stores a decryption key or keys associated with the cryptographic pseudorandom number generator which generated the serial numbers for the modified PRN codes. The decryption key(s) may be received in advance and stored in the memory 42. The pseudorandom number generator 44 generates pseudorandom serial numbers 54 using the decryption key(s), being synchronized with the local PRN code generation for the incoming GNSS signal.

For example, this synchronization may be achieved using the time synchronization data transmitted in each open GNSS signal such as Time of Week in GPS. Such time synchronization data may be collected from the tracking loops 28 using a time synchronization data collection block (circuit) 60, and the time synchronization data 62 is input to the pseudorandom number generator 44, as shown in FIG. 2. With this time synchronization, the pseudorandom serial number(s) 54 indicating the inverted bit position(s) in the corresponding (i.e., the current) period of the GNSS open service signal is generated and output to the inverted bit selector 46. It should be noted that more than one pseudorandom serial numbers may be generated for each period, if the modified PRN code signal in the received GNSS signal has been encrypted using more than one serial numbers as discussed above.

The inverted bit selector 46 selects an inverted bit amplitude which is an amplitude of the correlated signal 32 at the inverted bit (at the corresponding chip position), based on the pseudorandom serial numbers 54 and the locally-generated PRN code 34, and generates an inverted bit amplitude 56. For example, the inverted bit selector 46 outputs the amplitude of the correlated signal 32 only when a current bit serial number of the local pseudorandom noise code 34 received from the local PRN code generator 30 matches the pseudorandom serial number 54 received from the pseudorandom number generator 44. When there is no match, the amplitude of the correlated signal 32 may be discarded. Since the pseudorandom serial number 54 indicates the inverted bit positions in the corresponding period of the received, i.e., modified PRN code in the received GNSS signal, the negative value of the correlated signal 32, i.e., the inverted bit amplitude 56, is accumulated in the second accumulator 48.

The second accumulator 48 accumulates the inverted bit amplitude 56 output from the inverted bit selector 46 for the predetermined time interval which is the same time interval for which the corresponding correlated signal 32 is accumulated in the first accumulator 26, so as to generate an accumulated inverted bit amplitude Ii for the received PRN code signal.

It should be noted that since the received modified PRN code has the inverted bits, while the locally generated PRN code (replica) 34 does not have such inverted bits (i.e., having an opposite sign), the correlated signal 32 will have a "negative" amplitude at the inverted bit positions. Thus, if such amplitude at the inverted bit positions are sampled, the sampled amplitude also has a "negative" amplitude. On the other hand, if the received GNSS signal is counterfeit or not authentic, the received PRN code signal, which is not a modified PRN code signal, does not have the inverted bits where they should be. Accordingly, the correlated signal 32 of such counterfeit GNSS signal would have a "positive" constant amplitude over the entire period, without noise. Thus, the accumulated inverted bit amplitude Ii will have a "negative" amplitude if the received GNSS signal is authentic, while a positive sign of the accumulated inverted bit amplitude indicates that the received PRN code is not modified, i.e., the received GNSS signal is counterfeit.

The ratio calculator 50 calculates a ratio of the accumulated inverted bit amplitude (−Ii) to the accumulated signal amplitude (Iu). It should be noted that the negative sign (−) indicates that in the ratio calculation, the original (supposed to be) negative value of the accumulated inverted bit amplitude is reversed such that the ratio (−Ii/Iu) is calculated as a supposed-to-be positive and greater value for authentic GNSS signals. In the case of counterfeit GNSS signals, the originally positive value of the accumulated inversed bit signal amplitude will be reversed to a negative (i.e., smaller) value, making the subsequent comparison process simpler.

The determining section 52 compares the ratio (−Ii/Iu) with a first threshold value and a second threshold value, and outputs a determination signal 58 indicating (i) that the received GNSS signal is counterfeit if the ratio is smaller than the first threshold value, (ii) that the received GNSS signal is authentic if the ratio is greater than the second threshold value, and (iii) that the received GNSS signal is unauthenticated if the ratio is between the first threshold value and the second threshold value.

If the ratio (−Ii/Iu) is between the first threshold and the second threshold, the ratio calculation in the ratio calculator 50 may be continued for an extend time interval, and the calculated ratio (−Ii/Iu) may be further accumulated in the determining section 52 to further perform the comparison with the first and second threshold values.

Based on the determination, the GNSS receiver 10 discards the GNSS signals determined as counterfeit such that the further applications processing (for deriving navigation solutions) is performed with the authenticated GNSS signals only.

Figure 3:
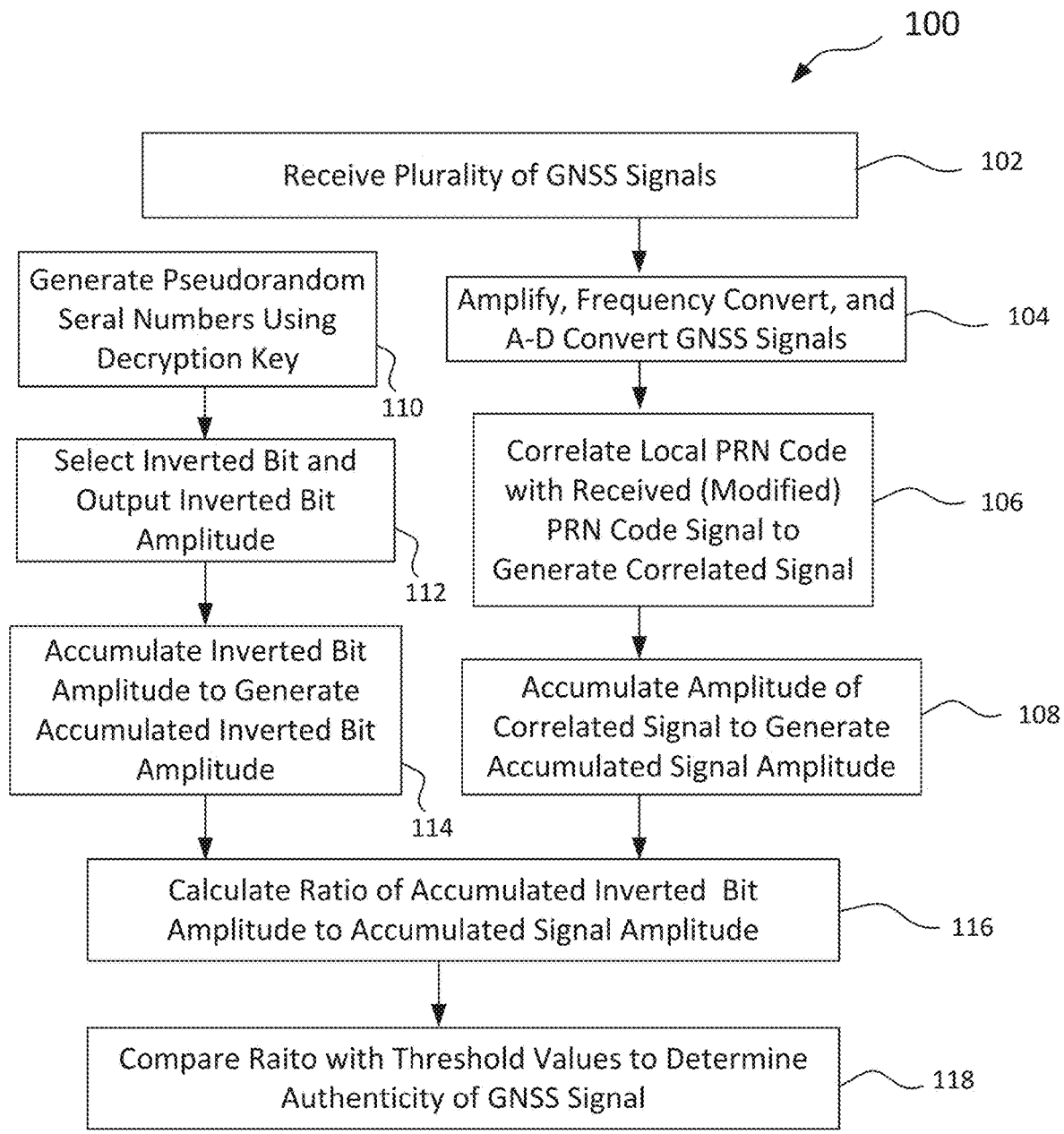
FIG. 3 is a process flow diagram schematically illustrating a method for authenticating GNSS open service signals in accordance with one embodiment of the present invention.

FIG. 3 illustrates a method 100 for authenticating open service signals in Global Navigation Satellite Systems (GNSS) at a GNSS receiver, for example, the GNSS receiver 10 as described above, in accordance with one embodiment of the present invention. The GNSS receiver received a plurality of GNSS signals at GNSS antenna (102). As discussed above, the GNSS signals each includes a pseudo-random noise code having a predetermined period of a binary bit sequence of N bits (N: a natural number). The received pseudorandom nose code is supposed to be a modified pseudorandom noise code including a plurality of inverted bits at positions each specified by a serial number. The serial number is generated for each period using a cryptographic pseudorandom number generator such that at least one of the position of the inverted bit and a number of the inverted bit(s) in the period varies period by period.

The received GNSS signals are amplified, frequency-converted, and analog-to-digital converted at a frontend (RF) section (104). The GNSS receiver generates a local PRN code using a local PRN code generator, and correlate the local PRN code with a received PRN code signal so as to generate a correlated signal (106). An amplitude of the correlated signal is accumulated for a predetermined time interval, thereby obtaining an accumulated signal amplitude for the received PRN code signal (108). On the other hand, pseudorandom serial numbers are generated by a pseudo-random number generator (110), using a decryption key associated with the cryptographic pseudorandom number generator which was used to generate the modified PRN code in the GNSS signals. The generation of the pseudo-random serial number is synchronized with the generation of the local PRN code generation for the incoming GNSS signal, such that the generated pseudorandom serial numbers indicate the positions of the inverted bit in the corresponding (i.e., the current) period of the modified PRN code in the incoming GNSS signal. An amplitude of the correlated signal at the inverted bit position is selected based on the pseudorandom serial numbers and the local PRN code and output as a inverted bit amplitude (112). For example, the inverted bit amplitude is output if a current bit serial number of the local PRN code for the correlated signal matches the pseudorandom serial number indicating the inverted bit position, and otherwise the amplitude of the correlated signal is discarded.

The inverted bit amplitude is accumulated for the predetermined time interval, so as to obtain an accumulated inverted bit amplitude for the received PRN code signal (114). A ratio of the accumulated inverted bit amplitude to the accumulated signal amplitude is calculated (116), and the ratio is compared with a first threshold value and a second threshold value so as to determine (118) that the received GNSS signal is counterfeit if the ratio is smaller than the first threshold value, that the received GNSS signal is authentic if the ratio is greater than the second threshold value, and that the received GNSS signal is unauthenticated if the ratio is between the first threshold value and the second threshold value.

In accordance with one embodiment of the present invention, the open signal authentication section 40 described above may be provided to an existing GNSS receiver as an open signal authentication apparatus so as to allow the GNSS receiver to authenticate GNSS signals including the modified PRN code as described above.

In the above-mentioned examples, the local PRN code generator 30 generates a replica of the unmodified PRN code to correlate with the modified PRN code signal in the received GNSS signals. However, it is also possible to modify the local PRN code generator 30 to generate a replica of the modified PRN code based on the generated pseudo-random serial numbers 54. In such a case, the amplitude of the correlated signal 32 for an authentic GNSS signal would be a "positive" constant over the entire code period (except noise) including the inverted bits, while that for a counterfeit or spoofed GNSS signal would be "negative" at the inverted bit positions, with the remaining portion positive (except noise). Accordingly, when the amplitude of the correlated signal at the negative bit position is accumulated, the more "negative" (i.e., the smaller) the accumulated amplitude becomes, the more likely that the received GNSS signal is counterfeit. Accordingly, the authentication of the received GNSS open service signal can be performed in a similar manner as that in the above-mentioned examples by comparing with the two threshold values.

Although this implementation involves the modification of the local PRN code generator 30, since the received PRN code and the local PRN code (replica) are identical to each other including the inverted bits, the signal to noise (S/N) ratio of the correlated signal will be improved, compared with the previous examples.

In addition, the GNSS receiver and the open signal authentication section/apparatus implementing the present invention may be configured as a computer including a CPU, a memory (RAM, ROM), and the like therein so as to have the necessary structures and functions. These functions may be realized by means of software/computer programs realizing the respective functions, but a part or the whole of them may be realized by hardware.

As the number of GNSS satellites which transmit GNSS signals including the modified PRN code and are visible in a certain geographical region may not be sufficient to provide reliable navigation services for that geographical region. For example, the number of QZSS satellites may not be sufficient to reliably calculate the position of a GNSS receiver in Japan. Thus, the secure PRS signals of other GNSS satellites, for example, the Galileo satellites may also be used by providing interoperability with the QZSS satellites, as mentioned above.

Thus, in accordance with one embodiment of the present invention, a method provides a region-dependent access to encrypted service signals in Global Navigation Satellite Systems (GNSS). A plurality of different encryption keys and/or encryption methods are provided to a GNSS satellite. That is, such GNSS satellite is capable of performing two types of encryption of its GNSS signals. When the GNSS satellite is located in such a position in which the coordinates of the GNSS satellite in the Earth-Centered, Earth-Fixed (ECEF) coordinate system is in a first range, the GNSS satellite transmits the GNSS signals using a first encryption key and/or encryption method, and if the GNSS satellite is located in such a position in which the coordinates of the GNSS satellite in the ECEF coordinate system is in a second range, the GNSS satellite transmits the GNSS signals using a second encryption key and/or encryption method.

For example, a Galileo satellite may be provided with a second encryption key/method to transmit its signals in addition to the current Public Regulated Service (PRS) signals (the first encryption key/method). Thus, when the Galileo satellite is visible in Europe (a first region), it may use the PRS signals as the first encryption scheme, and GNSS receivers in the European member state utilize the PRS signals. When the Galileo satellite is invisible from Europe, but visible from Japan (a second region), for example, the Galileo satellite transmits the PRS signals using a second encryption key/method. A decryption key(s) corresponding to the second encryption key/method is provided to GNSS receivers in Japan in advance. Thus, such GNSS receives in Japan are able to utilize the secure PRS signals from Galileo satellites (using the second encryption), in addition to the above-mentioned secure GNSS signals with the modified PRN code, thereby obtaining a sufficient number of such secure GNSS signals resistant to spoofing. Such a GNSS receiver performs both of the authentication of the modified open GNSS signals as discussed above, and the decryption/authentication for the second encryption key/method which is used by the Galileo satellites.

Thus, more generally, the method in accordance with one embodiment of the present invention includes providing a first decryption key corresponding to the first encryption key and/or encryption method to a GNSS receiver in a first region from which the GNSS satellites in the first range are visible, and also providing a second decryption key corresponding to the second encryption key and/or encryption method to a GNSS receiver in a second region from which the GNSS satellites in the second range is visible.

In accordance with one embodiment of the present invention, the method and apparatus for providing authentication to GNSS open service signals using the modified PRN code discussed above further implement the method for providing a region-dependent access to encrypted service signals in GNSS, such that a sufficient number of secure (i.e., authenticatable) GNSS satellite signals are utilized in a certain region so as to provide secure and spoof resistant navigation services.

In accordance with one embodiment of the present invention, the method as described above may be implemented in a non-transitory computer-readable storage medium with an executable program stored thereon. The program instructs a microprocessor to perform the method described above.

While this invention has been described in terms of several preferred embodiments, there are alterations, permutations, modifications, and various substitute equivalents, which fall within the scope of this invention. It should also be noted that there are many alternative ways of implementing the methods and apparatuses of the present invention. It is therefore intended that the following appended claims be interpreted as including all such alterations, permutations, and various substitute equivalents as fall within the true spirit and scope of the present invention.

What is claimed is:

1. A method for providing authentication mechanism to open service signals in Global Navigation Satellite Systems (GNSS), the method comprising:

inverting a plurality of bits in a pseudorandom noise code in a GNSS signal having a predetermined period of a binary bit sequence of N bits (N: a natural number), a position of each inverted bit in the binary bit sequence being specified by a serial number generated for each period using a cryptographic pseudorandom number generator, whereby at least one of the position of the inverted bit and a number of the inverted bits in the period varies period by period; and providing a decryption key to a GNSS receiver having a corresponding cryptographic pseudorandom number generator.

2. The method according to claim 1, wherein the pseudorandom noise code is a coarse acquisition (C/A) code having 1023 chips per period corresponding to the N bits.

3. The method according to claim 1, wherein the serial number ranges from 1 to N such that each period includes an inverted bit at the position corresponding to the serial number.

4. The method according to claim 1, wherein a plurality M (M: a natural number greater than 1) of serial numbers are generated for each period, each serial number ranging from 1 to N, such that each period includes M inverted bits at respective positions corresponding to the M serial numbers.

5. The method according to claim 1, wherein a plurality M (M: a natural number greater than 1) of serial numbers are generated per period, each serial number ranging from 1 to kN (k: a number greater than 1), such that each period includes 0 to M inverted bits at respective positions corresponding to the serial numbers which have a value between 1 to N, inclusive, among the M serial numbers, whereby providing M/k inverted bits per period on average.

6. A method for authenticating open service signals in Global Navigation Satellite Systems (GNSS), the method comprising:

receiving, at a GNSS receiver, a plurality of GNSS signals each including a pseudorandom noise code having a predetermined period of a binary bit sequence of N bits (N: a natural number), the received pseudorandom noise code being supposed to be a modified pseudorandom noise code including a plurality of inverted bits at positions each specified by a serial number, the serial number being generated for each period using a cryptographic pseudorandom number generator such that at least one of the position of the inverted bit and a number of the inverted bits in the period varies period by period;

amplifying, frequency converting, and performing analog-to-digital signal conversion of the received GNSS signal at the GNSS receiver;

correlating a local pseudorandom noise code generated in the GNSS receiver with a received pseudorandom noise code signal, thereby generating a correlated signal;

accumulating an amplitude of the correlated signal for a predetermined time interval, thereby obtaining an accumulated signal amplitude for the received pseudorandom noise code signal;

generating pseudorandom serial numbers by a pseudorandom number generator in the GNSS receiver using a decryption key associated with the cryptographic pseudorandom number generator;

selecting an inverted bit amplitude which is an amplitude of the correlated signal at the inverted bit, based on the pseudorandom serial numbers and the local pseudorandom noise code;

accumulating the inverted bit amplitude for the predetermined time interval, thereby obtaining an accumulated inverted bit amplitude for the received pseudorandom noise code signal;

calculating a ratio of the accumulated inverted bit amplitude to the accumulated signal amplitude;

comparing the ratio with a first threshold value and a second threshold value; and determining that the received GNSS signal is counterfeit if the ratio is smaller than the first threshold value, that the received GNSS signal is authentic if the ratio is greater than the second threshold value, and that the received GNSS signal is unauthenticated if the ratio is between the first threshold value and the second threshold value.

7. The method according to claim 6, further comprising, if the ratio is between the first threshold and the second threshold:
continuing the calculating the ratio;
accumulating the calculated ratios for an extend time interval to produce an accumulated ratio; and
comparing the accumulated ratio with the first and second threshold to perform the determination.

8. The method according to claim 6, wherein the selecting the inverted bit amplitude includes:
outputting an amplitude of the correlated signal, if a current bit serial number of the local pseudorandom noise code for the correlated signal matches the pseudorandom serial number indicating the inverted bit position in the corresponding period.

9. A Global Navigation Satellite Systems (GNSS) receiver capable of authenticating GNSS open service signals, the GNSS receiver comprising:
a GNSS antenna configured to receive a plurality of GNSS signals each including a modified pseudorandom noise code having a predetermined period of a binary bit sequence of N bits (N: a natural number), the modified pseudorandom noise code including a plurality of inverted bits at positions each specified by a serial number, the serial number being generated for each period using a cryptographic pseudorandom number generator such that at least one of the position of the inverted bit and a number of the inverted bits in the period varies period by period;
a frontend section for amplifying, frequency converting, and performing analog-to-digital signal conversion of the received GNSS signals;
a digital processing section, including:
a correlator configured to correlate a locally-generated pseudorandom noise code with a received pseudorandom noise code signal, thereby generating a correlated signal; and
a first accumulator configured to accumulate an amplitude of the correlated signal for a predetermined time interval, thereby producing an accumulated signal amplitude for the received pseudorandom noise code signal; and
an open signal authentication apparatus, including:
a memory storing a decryption key associated with the cryptographic pseudorandom number generator;
a pseudorandom number generator configured to generate pseudorandom serial numbers using the decryption key;
an inverted bit selector configured to select an inverted bit amplitude which is an amplitude of the correlated signal at the inverted bit, based on the pseudorandom serial numbers and the locally-generated pseudorandom noise code;
a second accumulator configured to accumulate the inverted bit amplitude for the predetermined time interval, thereby generating an accumulated inverted bit amplitude for the received pseudorandom noise code signal;
a calculating section configured to calculate a ratio of the accumulated inverted bit amplitude to the accumulated signal amplitude; and
a determining section configured to compare the ratio with a first threshold value and a second threshold value, thereby outputting a determination signal indicating that the received GNSS signal is counterfeit if the ratio is smaller than the first threshold value, that the received GNSS signal is authentic if the ratio is greater than the second threshold value, and that the received GNSS signal is unauthenticated if the ratio is between the first threshold value and the second threshold value.

10. The GNSS receiver according to claim 9, wherein the inverted bit selector is configured to outputting an amplitude of the correlated signal, if a current bit serial number of the local pseudorandom noise code for the correlated signal matches at least one of the pseudorandom serial numbers indicating the inverted bit position in the corresponding period.

11. An apparatus for authenticating open service signals in Global Navigation Satellite Systems (GNSS) signals received at a GNSS receiver, each of the GNSS open service signals including a modified pseudorandom noise code having a predetermined period of a binary bit sequence of N bits (N: a natural number), the modified pseudorandom noise code including a plurality of inverted bits at positions each specified by a serial number, the serial number being generated for each period using a cryptographic pseudorandom number generator such that at least one of the position of the inverted bit and a number of the inverted bits in the period varies period by period, the apparatus being in communication with a digital signal processor of the GNSS receiver, the apparatus comprising:
a memory storing a decryption key associated with the cryptographic pseudorandom number generator used for generating the modified pseudorandom noise code;
a pseudorandom number generator configured to generate pseudorandom serial numbers using the decryption key;
an inverted bit selector configured to select an inverted bit amplitude which is an amplitude of the correlated signal at the inverted bit, based on the pseudorandom serial numbers and the locally-generated pseudorandom noise code, by outputting an amplitude of the correlated signal, if a current bit serial number of the local pseudorandom noise code for the correlated signal matches at least one of the pseudorandom serial numbers indicating the inverted bit position in the corresponding period;
an accumulator configured to accumulate the inverted bit amplitude for a predetermined time interval, thereby generating an accumulated inverted bit amplitude for the received pseudorandom noise code signal;
a calculating section configured to receive, from the digital signal processing section, an accumulated signal amplitude of the received pseudorandom noise code signal, the accumulated signal amplitude being an accumulation of an amplitude of the correlated signal for the predetermined time interval, and to calculate a ratio of the accumulated inverted bit amplitude to the accumulated signal amplitude; and
a determining section configured to compare the ratio with a first threshold value and a second threshold value, thereby outputting a determination signal indicating that the received GNSS signal is counterfeit if the ratio is smaller than the first threshold value, that the received GNSS signal is authentic if the ratio is greater than the second threshold value, and that the received GNSS signal is unauthenticated if the ratio is between the first threshold value and the second threshold value.

* * * * *